United States Patent [19]

Sayers

[11] Patent Number: 6,067,275
[45] Date of Patent: May 23, 2000

[54] METHOD OF ANALYZING PRE-STACK SEISMIC DATA

[75] Inventor: Colin M. Sayers, Katy, Tex.

[73] Assignee: Schlumberger Technology Corporation, Ridgefield, Conn.

[21] Appl. No.: 09/222,023

[22] Filed: Dec. 29, 1998

[30] Foreign Application Priority Data

Dec. 30, 1997 [GB] United Kingdom .................... 9727417

[51] Int. Cl.$^7$ ........................................ G01V 1/40
[52] U.S. Cl. ................................. 367/75; 367/50
[58] Field of Search ................................ 367/75, 50, 51, 367/52, 73, 31

[56] References Cited

U.S. PATENT DOCUMENTS

| 4,933,913 | 6/1990 | Thomsen ................................... 367/75 |
| 4,947,381 | 8/1990 | McCormack ............................. 367/75 |
| 5,128,899 | 7/1992 | Boyd et al. ............................... 367/50 |
| 5,596,547 | 1/1997 | Bancroft et al. ......................... 367/51 |

OTHER PUBLICATIONS

Tariq Alkhalifah and Ilya Tsvankin (Velocity analysis for transversely isotropic media) Aug. 31, 1994 pp. 1550–1565.
Michael Schoenberg et al, "introducing annie: Asimple three–paramet anisotropic velocity model for shales" Journal of Seismic Exploration 1996,p. 35–49.
Zeng Xw et al (algebraic processing techniques for estmating shear–wave splitting in near–offset VSP DATA (Abstract).

Spratt,S .(effect of normal moveout errors on amplitude versus offset–derived shear reflectivity ) Abstract.

Hornby,B.E. (experimental laboratory determination of the dynamic elastic properties of wet,drained Dec. 10, 1998 shales) Abstract.

Janle,H et al (Development of a method for Routine Registration of shear waves) Abstract. Apr. 82.

Balachandran,k (Fracture detection using back–scattered shear waves) 1996; Abstract.

Simmons et al (waveform–based AVO inversion and AVO prediction–error) Nov–Dec 1996; Abstract.

Tariq Alkhalifah et al, "Velocity analysis for transversely isotropic media" Geophysics, vol. 60 No. 5, Sep.–Oct. 1995) p. 1550–1566.

Primary Examiner—Christine K. Oda
Assistant Examiner—Anthony Jolly
Attorney, Agent, or Firm—William L. Wang; William B. Batzer

[57] ABSTRACT

A method for using S-waves recorded at sea floor to determine anellipticity relating to at least one rock substrate is provided. In particular the method comprises identifying an S-wave event in recorded pre-stack seismic data and then determining at least one anisotropy parameter by adjusting moveout of a corresponding modeled S-wave event to agree with moveout of the identified S-wave event. The method is particularly applicable to mode converted S-waves in seismic signals.

17 Claims, 5 Drawing Sheets

METHOD OF ANALYZING PRE-STACK SEISMIC DATA

This invention relates to a method of analyzing pre-stack seismic data, in particular to determine at least one anisotropy parameter.

BACKGROUND OF THE INVENTION

When analyzing seismic data, the seismic velocity of waves reflected from strata may vary depending on the direction of measurement, thus exhibiting anisotropy. This anisotropy needs to be taken into account, for example, in cases where shales overlie hydrocarbon reservoirs.

Alkhalifah, Geophysics 60: 1550–1566, 1995, shows that a single anisotropy parameter $\eta$ is sufficient to perform anisotropic time migration if the rocks can be approximated as transversely isotropic with a vertical axis of symmetry. The parameter $\eta$ needs to be determined if information on strata is to be usefully determined from seismic signals, and in particular from S-waves (Shear waves) which have propagated through an anisotropic medium.

Whilst Alkhalifah proposed a method for determining $\eta$ using short-offset seismic data from two reflectors of different dip (e.g a fault and a gently dipping reflector), in many cases the layers above the zone of interest, i.e. the overburden, will be flat lying and lack steeply dipping reflectors. In such cases, the method proposed by Alkhalifah becomes difficult to use.

The present invention aims to provide a method for analyzing pre-stack data which allows determination on of the anellipticity relating to a seismic wave propagating in an anisotropic medium, the anellipticity being closely related to the anisotropy parameter $\eta$.

SUMMARY OF THE INVENTION

The objects of the invention are achieved by methods and apparatus as set forth in the appended independent claims.

In accordance with a first aspect of the invention, there is provided a method of analyzing pre-stack seismic data, comprising:

(a) identifying an S-wave event in recorded pre-stack seismic signals; and (b) determining at least one anisotropy parameter by adjusting moveout of a corresponding modeled S-wave event to agree with moveout of the identified S-wave event.

The moveout is the variation in travel time of wave signals with source/receiver offset. In the marine environment, the S-wave seismic signals are acquired at the seafloor, and are generally mode-converted S-waves having traveled down to seismic reflectors as P-waves, mode converted to S-waves and then traveled up as S-waves to a receiver placed on the seabed. Alternatively, the S-waves might be generated directly by suitable S-wave sources placed on the seafloor.

Preferably the method according to the invention includes locating zero-offset time of S-waves in the recorded pre-stack data. The moveout may then be adjusted by altering an anellipticity factor in an anisotropic velocity model to bring corresponding modeled S-wave events into agreement with identified S-wave events in the recorded data.

For any given set of recorded and modeled seismic events, the matching of corresponding events to determine an anisotropy parameter may be achieved by the use of semblance or coherence measures. The application of the semblance or coherence methods is used in normal-moveout correction for example see W. M. Telford et al, Applied Geophysics, 2nd ed., p232–233.

In accordance with another aspect of the present invention, there is provided a method of determining anellipticity from seismic signals, comprising:

(a) determining the moveout of mode converted S-waves in the seismic signals;

(b) building an isotropic P-wave velocity model from the seismic signals;

(c) estimating an isotropic S-wave velocity model;

(d) identifying events in the seismic signals corresponding to mode converted S-waves;

(e) adjusting the isotropic S-wave velocity using the mode converted S-wave events; and (f) iteratively adjusting an anisotropic velocity model including an anellipticity factor so as to alter the anellipticity factor until the moveout of the mode converted S-waves in the S-wave model agrees with the moveout of the mode converted S-waves observed in the seismic signals.

Preferably the S-wave velocity model is estimated using the isotropic P-wave velocity model and an empirical relation between the vertical P and S-wave velocities. One such empirical relation is the "mudrock-line" where $v_S = 0.862 v_P - 1.1724$, where $v_S$ is the velocity of a shear wave and $v_P$ is the velocity of a P-wave, see Castagna, Geophysics 50: 571–581, 1985. Other empirical relations between $v_P$ and $v_S$ may also be used.

For example Foster et al (EAGE 58$^{th}$ Conference, Amsterdam, Jun. 3–7, 1996, Extended Abstract M041) give an appropriate relation valid in the Norwegian sector of the North Sea.

Any anisotropic velocity model where anisotropy is represented in terms of a single anisotropy parameter may be used. The preferred anisotropic velocity model for use with the present method is the ANNIE model as disclosed in Schoenberg, J. Seis. Expl. 5: 35–49, 1996. Alternatively, a K-medium as described by Krey and Helbig in: Geophys. Prosp. 4, 294–342, 1956, can be used. Or any other model which represents the anisotropy in terms of the single anisotropy parameter $\eta$ or its equivalent or any medium characterized by only three independent elastic stiffnesses may also be used.

Identifying the events of mode converted S-waves may be achieved by comparing the prediction of ray tracing with pre-stack data recorded at the sea floor, using an initial S-wave velocity model derived from a P-wave velocity model using an appropriate empirical correlation between $v_P$ and $v_S$.

Preferably the adjustment of the isotropic S-wave velocity model occurs until the short-offset travel times in the isotropic S-wave model agree with those in the pre-stack data.

Determination of the anellipticity then enables anisotropic processing of both P and S-wave data.

According to a further aspect of the present invention, there is provided a method of using mode converted S-waves recorded at seafloor to determine anellipticity relating to at least one rock substrate, typically where rocks are overlying a reservoir.

The invention also includes a seismic survey comprising:

(a) laying a marine cable capable of simultaneously measuring pressure waves and shear waves;

(b) firing an acoustic source;

(c) recording seismic data at seafloor;

(d) identifying an S-wave event in the recorded data; and (e) determining at least one anisotropy parameter by adjusting moveout of a corresponding modeled S-wave event to agree with moveout of the identified S-wave event.

Preferably the seismic data is transmitted to a processing center, the processing center typically being either a survey vessel or a land based station.

Whilst detection and analysis of P-waves forms the basis of most commercial seismic surveys, the present invention allows velocity analysis of S-waves measured at the sea floor, so providing information on the subsurface lithology and pore fill.

These and other features of the invention, preferred embodiments and variants thereof, and further advantages of the invention will become appreciated and understood by those skilled in the art from the detailed description and drawings following below.

MODE(S) FOR CARRYING OUT THE INVENTION

When obtaining seismic data by use of seismic sources and receivers, the signals from the source are reflected from substrate boundaries within the earth and these reflected seismic waves are incident on the receivers. Rocks, such as shales, are anisotropic as a result of layering and a partial alignment of plate-like clay minerals, and where seismic waves travel through such anisotropic layers, the seismic velocity of the reflected waves varies depending on the direction in which the velocity is measured. This will distort the moveout velocity and shift the reflection point of waves.

The anisotropy of many sedimentary formations can be described to a good approximation, as being transversely isotropic, i.e. having elastic properties the same in any direction perpendicular to an axis and five independent density-normalized elastic stiffness constants, $a_{11}$, $a_{12}$, $a_{13}$, $a_{33}$ and $a_{55}$.

Alkhalifah (referenced above) showed that a single anisotropy parameter $\eta$ defined by $$\eta = \frac{1}{2}\left\{\frac{v_H^2(P)}{v_{NMO}^2(P)} - 1\right\} \quad [1]$$

is sufficient to perform anisotropic time migration on seismic signals if the sedimentary rocks are transversely isotropic with a vertical axis of symmetry. Here $v_H(P)$ is the horizontal velocity and $v_{NMO}(P)$ is the normal moveout (NMO) velocity for P-waves. The parameter $\eta$ is normally positive, so that an assumption of isotropy gives a biased estimate. In terms of the density-normalized elastic stiffnesses $a_{ij}$ of a transversely isotropic medium, the horizontal velocity, $v_H(P)$ and the NMO velocity, $v_{NMO}(P)$, for P-waves are given by $$V_H^2(P) = a_{11} \quad [2]$$

$$V_{NMO}^2(P) = a_{55} + (a_{13} + a_{55})^2 / (a_{33} - a_{55}) \quad [3]$$

Although $v_{NMO}(P)$ can be obtained from short-offset surface seismic data, $v_H(P)$ can not be so obtained. The parameter $\eta$ is closely related to an anellipticity parameter A defined by $$A = (a_{11} - a_{55})(a_{33} - a_{55}) - (a_{13} + a_{55})^2 \quad [4]$$

The present invention uses P-waves and S-waves recorded at the sea floor to determine the anellipticity relating to a wave propagating in a transversely isotropic medium, and so arrive at $\eta$.

Each seismic wave has a phase velocity which is the velocity perpendicular to a surface of constant phase, i.e. the wavefront. The reciprocal of the phase velocity is slowness, which is a vector quantity. The anellipticity quantifies the deviation of the P-phase slowness surface from an ellipse and also determines the difference between the vertical and NMO velocities for shear waves polarized in the vertical plane (SV waves). When A=0, the P-phase slowness and group velocity are elliptical. A convenient normalized anellipticity parameter for P-waves is a defined by $$a = \frac{A}{a_{11}(a_{33} - a_{55})} = 1 - \frac{V_{NMO}^2(P)}{V_H^2(P)}, \quad [5]$$

where $v_H(P)$ is the horizontal P-wave velocity given by equation (2).

For an elliptically anisotropic medium, $v_{NMO}(P)=v_H(P)$ and the anellipticity parameter a vanishes. The parameter $\eta$ may then be written in terms of the anellipticity parameter a as follows $$\eta = \frac{a}{2(1-a)} \quad [6]$$

Figure 1:
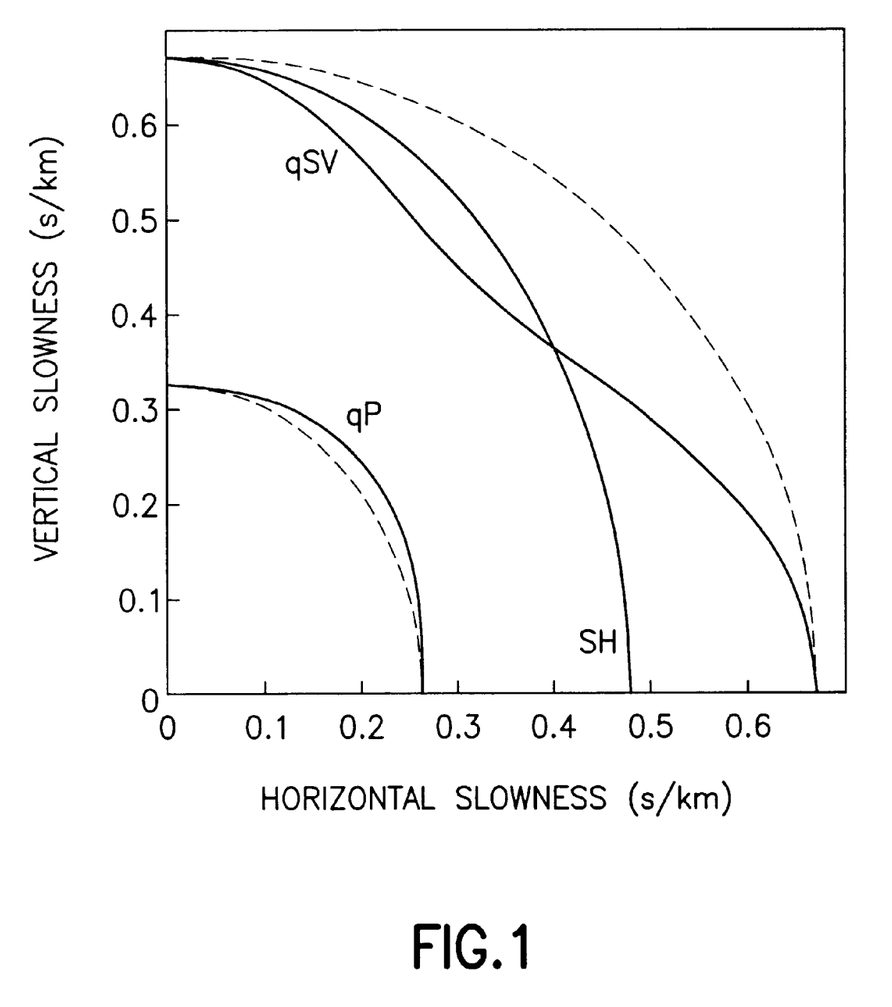
FIG. 1 compares phase slowness curves for an anisotropic shale with those for an elliptically anisotropic medium having the same axial P and S velocities.

FIG. 1 shows the phase slowness surface for Greenhorn shale as a solid line, with the dotted lines showing the phase slowness curves for an elliptically anisotropic medium having the same axial P and S velocities, see Jones, Geophysics, 46: 288–297, 1981. In FIG. 1 the horizontal P slowness $$\sqrt{1/a_{11}}$$

is seen to be smaller than the vertical P slowness $$\sqrt{1/a_{33}}.$$

The quasi-P-wave (qP-wave) slowness curve bulges out from the ellipse connecting the vertical and horizontal P slowness. This is called 'positive anellipticity', and implies that for oblique directions the medium through which the seismic waves travel is slower (for qP-waves) than an elliptical transversely isotropic medium with the same values of $a_{11}$ and $a_{33}$. Positive anellipticity also implies that the quasi-SV (qSV)-phase slowness curve is pushed inwards from the circle that connects its horizontal and vertical slowness, both of which are equal to $$\sqrt{1/a_{55}}.$$

The horizontal shear (SH) slowness curve is always an ellipse, implying that the wavefront curve is elliptical as well, and for shales, typically, the horizontal SH slowness is smaller than the vertical shear slowness. The SV slowness is seen to be much more sensitive to the anellipticity than the P-wave, and the present method exploits this.

In the marine environment, SV waves are created by mode conversion at boundaries between different rock types. The present method uses, in addition to reflected P waves, waves which travel down to reflectors as P-waves, mode convert to SV waves, and travel up as S-waves to a combined geophone and hydrophone acquisition cable placed at the sea-bed. Such waves can be termed PSV waves as they have originated as P waves and then been converted to SV waves. Acquiring shear wave seismic data as a supplement to conventional compressional wave seismic data helps to distinguish between lithology and pore fluid effects and to assist detailed reservoir characterization and monitoring. Whilst P-waves are sensitive to variations in lithology (sand/shale), porosity, and pore fluid, when interpreting P-wave anomalies without additional information, it is often difficult to determine what is varying. However as S-waves respond only to charges in lithology and porosity, the comparison of P-wave and S-wave data reduces ambiguity and the reliability of the interpretation of seismic data is significantly improved.

Being able to analyze S-wave data is also of advantage in helping characterize reservoirs. For example, as shear waves are relatively unaffected by fluids, they can be used to obtain structural information in areas where P-waves fail to produce coherent images, for example below gas chimneys often found above reservoirs. S-waves can also help determine the density and orientation of natural fractures, and the regional stress direction.

Figure 2:
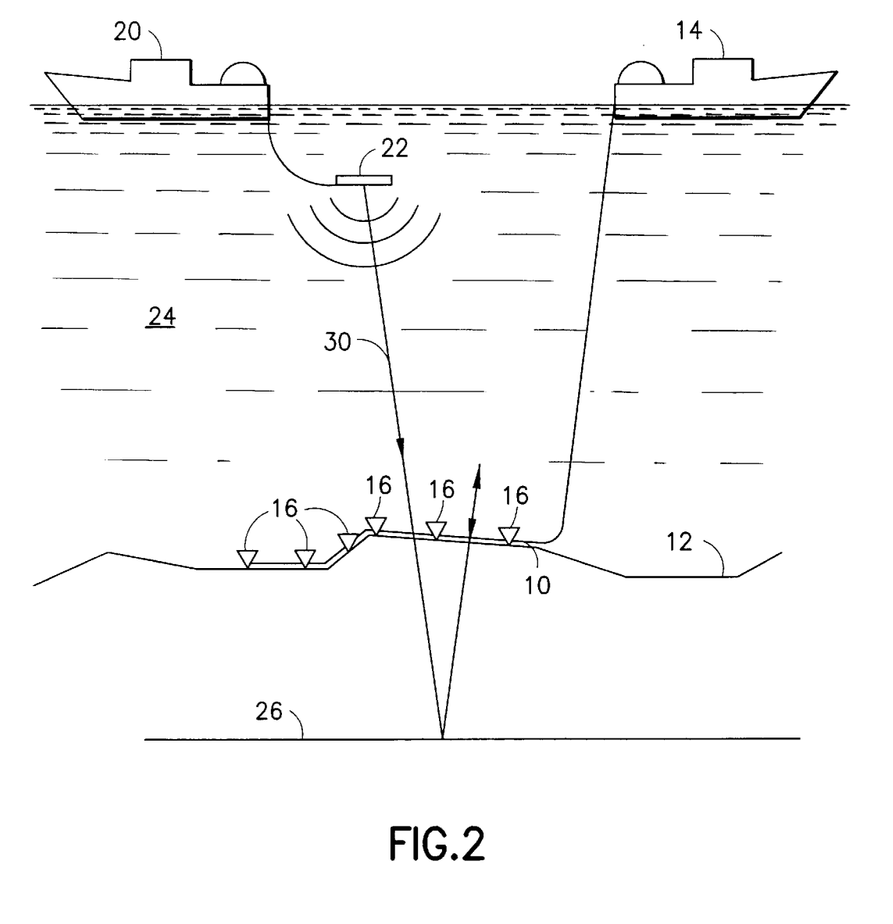
FIG. 2 shows apparatus for acquiring seismic signals.

As the sea cannot support shear waves, direct recording of shear waves in marine environments is not possible with towed streamer acquisition techniques. A typical apparatus for acquiring these SV wave components and P wave components is shown in FIG. 2. The apparatus is an ocean bottom cable (10) deployed on the sea floor (12) and attached to a vessel (14). The cable (10) is typically several miles long and multiple cables may be deployed in parallel. Each sea bottom cable (10) used has a plurality of sensor pairs (16) placed at regular intervals along the cable. Each sensor pair (16) contains a particle velocity sensor for detecting shear wave components such as a geophone, and a pressure sensor for detecting P-wave components, such as a hydrophone. Alternatively, the P- and S-wave components can be determined using vertical and horizontal in-line geophones.

When acquiring data for analysis, a vessel (20) generates acoustic energy from source (22) in the form of P-waves which travel downwards through the sea (24) and down through the earth to reflect from formation layers such as layer (26). When this P-wave energy strikes boundaries of differing acoustic impedance at angles other than 90°, there is some mode-conversion into S-waves; this mode-converted energy is reflected back together with P-wave energy and recorded by sensors (16) in cable (10) on the seafloor, as shown by line (30). Two wave components at right angles must be measured, so therefore a geophone must detect at least one component in the inline direction if it is used in combination with a hydrophone. Alternatively a two component geophone detecting components in the in-line direction and the vertical direction can be used avoiding the need for a separate hydrophone. In this way, a P-wave receiver and a S-wave receiver are provided. Alternatively Schlumberger Geco-Prakla's Nessie 4C MultiWave Array can be used which records quality compressional and shear wave seismic data using a four-component (hydrophone and 3-component geophone) sensor system, and operates in water depths ranging from 20–700 m.

Acquiring the full elastic response (shear and compressional) of the subsurface in this way can greatly assist in the understanding of complex geological structures, and help to distinguish between changes in lithology and fluid content, for example.

Figure 3:
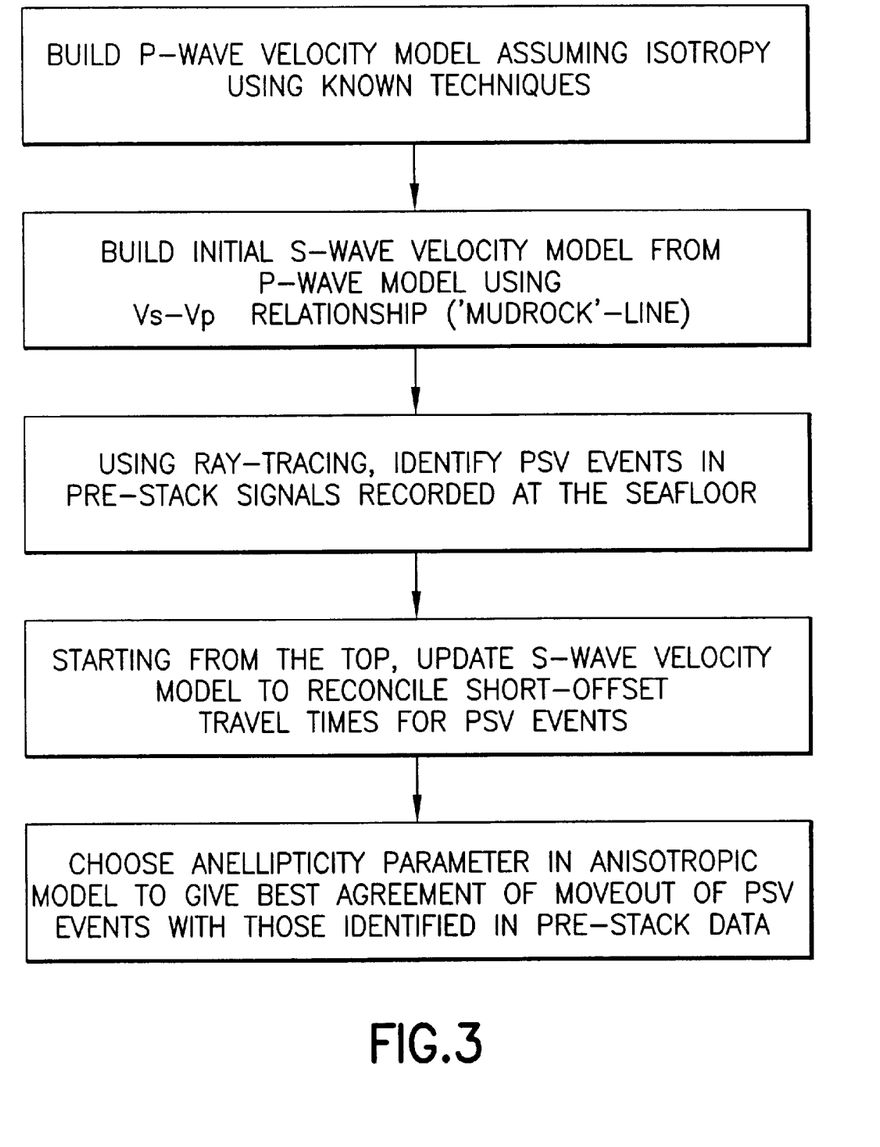
FIG. 3 is a flow diagram showing the steps of a method in accordance with an example of the present invention.

A preferred method of the present invention is illustrated in FIG. 3 and consists of the following steps:

1) P-wave velocity analysis
2) Use of 'mudrock-line' to build initial S-wave velocity model
3) Event correlation using ray tracing
4) S-wave velocity update to reconcile 'zero-offset' times
5) Anellipticity picked to obtain correct S-wave moveout These steps are discussed in detail below.

(1) P-wave velocity analysis

The depths calculated from P-wave stacking velocities are almost always within 10% of actual depths and often much closer. It is because of this that isotropic analysis has been very successful for the seismic industry, as long as the total angular aperture has been relatively small, see Winterstein, Geophysics, 51: 661–672, 1986. Therefore an initial isotropic P-wave velocity model is built using standard techniques, neglecting the anisotropy.

Defining a parameter $\delta$ by $$\delta = \frac{(a_{13} + a_{55})^2 - (a_{33} - a_{55})^2}{2a_{33}(a_{33} - a_{55})} \quad [7]$$

the NMO velocity of the P-wave, $v_{NMO}(P)$, is written as:

$$V_{NMO}(P) = V_V(P)\sqrt{1 + 2\delta} \quad [8]$$

where $v_V(P)$ is the vertical velocity of the P-wave.

It appears from equation (7) that the elastic constants $a_{13}$ and $a_{55}$ play an independent role in determining the value of $\delta$. However $\delta$ may be written in the form:

$$\delta = \chi + \frac{\chi^2}{2(1 - a_{55}/a_{33})} \quad [9]$$

where $$\chi = \frac{a_{13} + 2a_{55} - a_{33}}{a_{33}} \quad [10]$$

Since depths calculated from P-wave stacking velocities are almost always within 10% of actual depths, and often much closer, it follows that the parameter $\delta$ is small. Approximating $\delta$ by zero, equation (9) gives the following estimate for the elastic constant $a_{13}$ $$a_{13} = a_{33} - 2a_{55} \quad [11]$$

The elastic constant, $a_{12}$, does not enter the equations determining the P and SV-wave velocities and making the assumption that $a_{12}=a_{13}$ (which does not alter either the P or SV wave velocities) then gives the ANNIE model of Schoenberg (referenced above) which will be used in step (5) below. The ANNIE model is a simple three Parameter transversely isotropic velocity model intended as a reasonable first approximation for the elastic behavior of a wide variety of shales. Having determined the P-wave velocity structure, the ANNIE model is used to determine the anellipticity from mode-converted S-waves recorded at the seafloor.

(2) Use 'mud-rock line' to build initial S-wave velocity model

Figure 4:
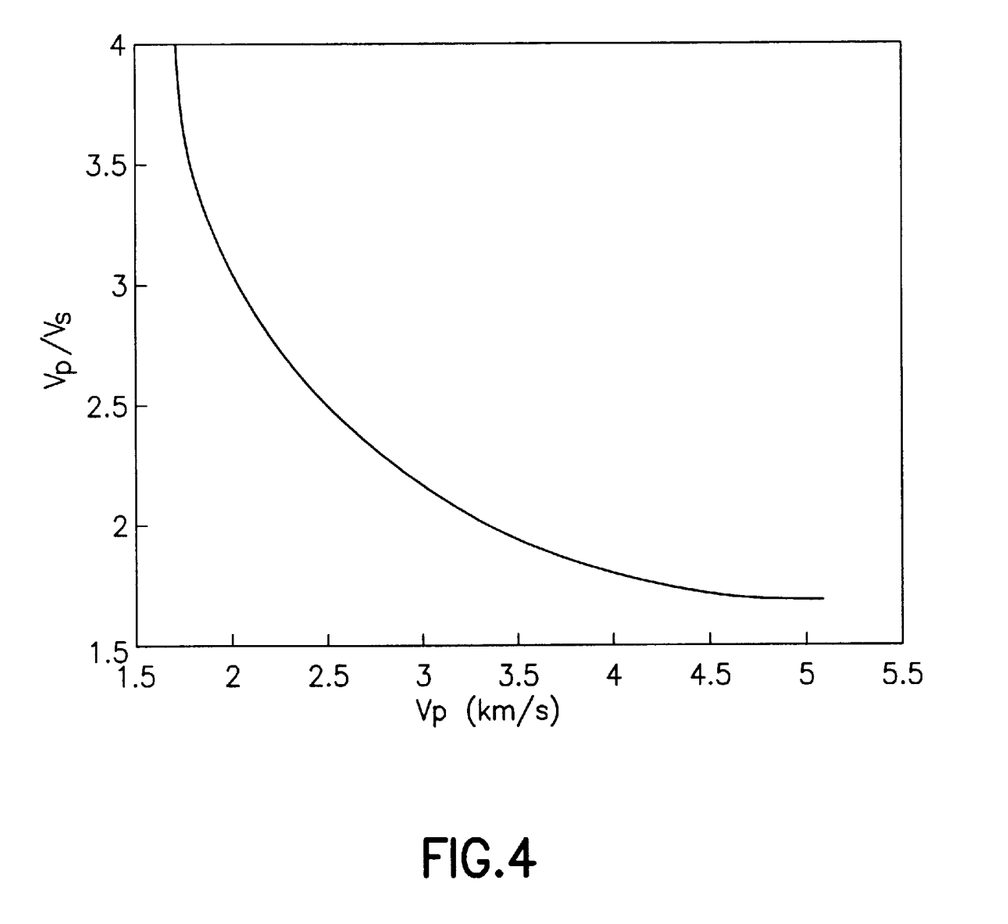
FIG. 4 shows one empirical relation between vertical P and S-wave velocities.

Having built the P-wave velocity model, an initial isotropic S-wave velocity model is estimated by adapting the P-wave velocity model with an empirical relationship between $v_S$ and $v_P$, such as the 'mudrock-line' see Castagna, Geophysics, 50: 571–581, 1985. The mudrock-line gives the following relation between the P-wave velocity, $v_P$, and the S-wave velocity, $v_S$:

$$v_S = 0.8621 v_P - 1.1724 \quad [12]$$

and this empirical relationship between $v_P$ and $v_S$ is shown in FIG. 4. Using the 'mudrock-line', the vertical S-wave velocities are estimated and thus an isotropic S-wave velocity model obtained.

(3) Event correlation using ray tracing

Having obtained an initial isotropic P and S velocity model, ray tracing is used to identify the mode-converted PSV waves on common receiver gathers. This is done by looking for events in the prestack data (recorded with an in-line horizontal geophone) that have similar travel times to those predicted using ray-tracing.

(4) S-wave velocity update to reconcile 'zero-offset' times

Having identified mode-converted PSV events in the pre-stack data, the isotropic shear wave velocity model is then adjusted working from the top of the model down until the short-offset travel times of mode converted S-waves as predicted by ray-tracing agree with those seen in the prestack data. This determines the vertical S-wave velocity, and therefore the density-normalized elastic constant $a_{55}$ which is related to the vertical S-wave velocity, $v_V(SV)$, by $$v_V^2(SV) = a_{55} \quad [13]$$

Figure 5A:
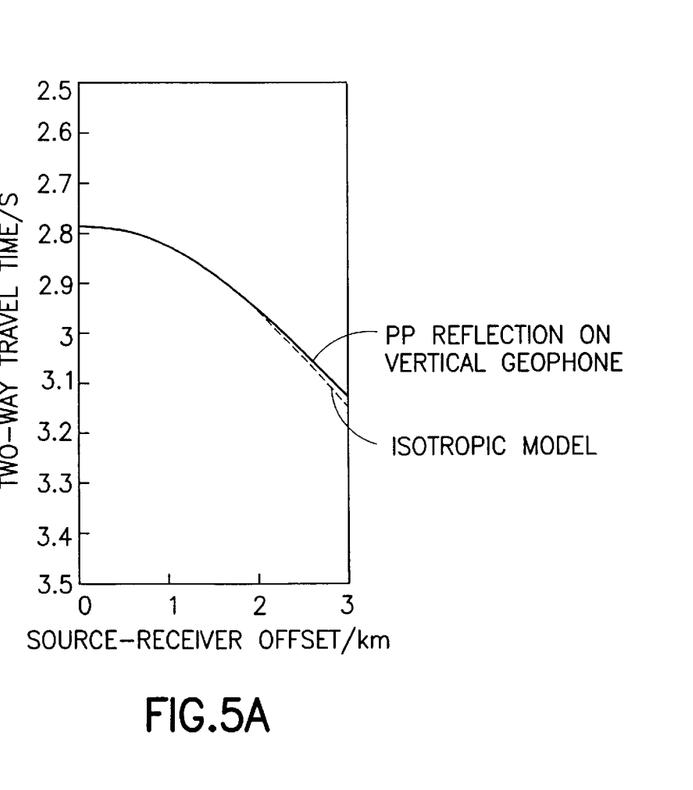
FIGS. 5A, B show move-out of signals acquired at a two-component geophone.
Figure 5B:
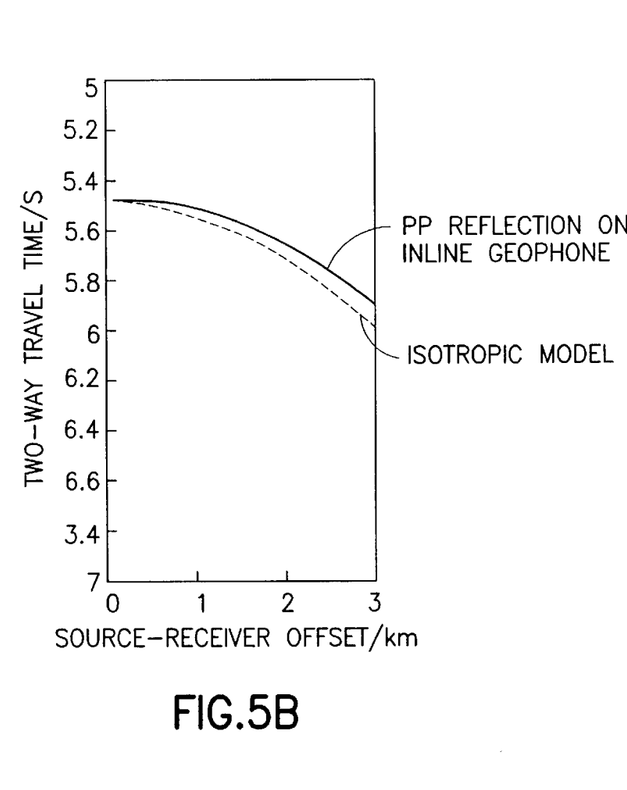

The zero-offset of the shear wave velocity model and the observed S-wave data are now in agreement. However the moveout, i.e. the variation in travel time with source/receiver offset, of the events will differ from that seen in the pre-stack data due to the neglect of the anellipticity. This is shown in FIGS. 5A and 5B where the moveout of the pre-stack data is shown in bold, with the moveout obtained for the isotropic shear wave velocity model shown with a dashed line. FIG. 5A shows the variation between pre-stack PP reflections (40) acquired on a vertical geophone and the isotropic P-wave model (42) and it will be seen that there is little deviation between the moveout of pre-stack data and the moveout of the isotropic P-wave model. However FIG. 5B compares the variation in moveout of pre-stack PS data (14) as obtained on an inline geophone with the isotropic shear wave velocity model (46). Whilst in this Figure, the zero-offset of the shear wave velocity model and the observed S-wave data are now in agreement, it will be seen that there is a significant difference between the moveout of the isotropic model and the moveout of the observed data. To compensate for this variation, the anellipticity must be considered and adjusted, as in step (5) below.

(5) Anellipticity picked to obtain correct S-wave moveout

To compensate the isotropic S-wave velocity model for anellipticity, the value of the anellipticity a in the ANNIE model is adjusted and the S-wave velocity model recalculated until at a certain value of the anellipticity a the moveout of the PSV waves in the data agrees with the moveout of the PSV events obtained using ray tracing, keeping the short-offset travel times fixed. When the observed moveout and the moveout of the model agree, the anellipticity a of the layers through which the seismic waves have propagated has been determined. As the anellipticity quantifies the deviation of P-phase slowness from an ellipse and also determines the difference between vertical and NMO velocities for SV-waves, the determination of the anellipticity a allows deviations in seismic signals due to anisotropy to be compensated for. Whilst detection and analysis of P-waves forms the basis of most commercial seismic surveys, the present invention allows velocity analysis and imaging of S-waves measured at sea floor by providing a method to determine the anellipticity. S-waves measured at the sea floor can thus be analyzed and used to provide information on the subsurface lithology and pore fill.

Since non-hyperbolic moveout and dip dependent stacking velocities of P-waves are also affected by the anellipticity, the estimation of anellipticity by the described method will allow improved P-wave processing such as NMO, DMO, time migration and Amplitude Versus Offset (AVO) analysis.

What is claimed is:

1. A method of analyzing pre-stack seismic data, comprising:
   (a) identifying a shear wave event in recorded pre-stack seismic data; and
   (b) determining at least one anisotropy parameter by adjusting said anisotropy parameter such that moveout of a corresponding modeled shear wave event agrees with moveout of the identified shear wave event.

2. The method of claim 1, including the step of adjusting short-offset travel times of a corresponding modeled shear wave event to agree with short-offset travel times of the identified shear wave event.

3. The method of claim 1, wherein the parameter is adjusted by altering an anellipticity factor in an anisotropic velocity model.

4. The method of claim 1, wherein the shear wave events are mode converted shear wave events.

5. The method of claim 1, including the step of using a P-wave model to build an initial shear wave model.

6. The method of claim 1, using ray-tracing methods to identify shear wave events.

7. The method of claim 1, wherein adjusting of corresponding modeled to identified shear wave events is performed using a semblance or coherence test method.

8. The method of claim 1, further comprising the step of using the at least one anisotropy parameter in further processing of the seismic signals, in particular to improve the processing of shear wave signals.

9. A method of determining anellipticity from seismic signals, comprising:

(a) building an isotropic P-wave velocity model from the seismic signals;

(b) building an isotropic shear wave velocity model using said P-wave model;

(c) identifying events in the seismic signals corresponding to mode converted shear waves;

(d) adjusting an anisotropic velocity model including an anellipticity factor by altering the anellipticity factor until moveout of the mode converted S-waves in the shear wave model agrees with moveout of the mode converted shear waves observed in the seismic signals.

10. The method of claim 9, wherein the shear wave velocity model is estimated using an isotropic P-wave velocity model and an empirical relation between the velocity of a P-wave and the velocity of an shear wave.

11. The method of claim 10, wherein the empirical relation is a mudrock-line.

12. The method of claim 9, wherein the anisotropic velocity model represents anisotropy in terms of a single anisotropy parameter, or, equivalently, only three independent elastic constants.

13. The method of claim 9, wherein the events of mode converted shear waves are identified by comparing results gained from ray tracing with pre-stack data recorded at sea floor.

14. The method of claim 9, wherein the S-wave velocity model is adjusted until the short-offset travel times of events in the shear wave model agree with those observed in the pre-stack seismic signals.

15. A seismic survey comprising:

(a) spreading a marine receiver array capable of measuring concurrent pressure waves and shear waves;

(b) activating a marine acoustic source;

(c) recording seismic signals;

(d) identifying a shear wave event in the recorded signals; and determining at least one anisotropy parameter to characterize subterranean formations by adjusting said anisotropy parameter such that moveout of a corresponding modeled shear wave event agrees with moveout of the identified shear wave event.

16. A seismic survey according to claim 15, further comprising transmitting the recorded seismic data to a processing center as pre-stack or post-stack data.

17. A method of using mode converted shear waves recorded at sea floor comprising:

determining anellipticity relating to at least one rock substrate by adjusting an anellipticity parameter such that moveout of a corresponding modeled shear wave event agrees with moveout of an identified shear wave event.

* * * * *